(12) United States Patent  (10) Patent No.: US 9,124,579 B2
Lee  (45) Date of Patent: Sep. 1, 2015

(54) SECURITY-ENHANCED CLOUD SYSTEM AND SECURITY MANAGEMENT METHOD THEREOF

(71) Applicant: Chung Jong Lee, Seoul (KR)

(72) Inventor: Chung Jong Lee, Seoul (KR)

( * ) Notice: Subject to any disclaimer, the term of this patent is extended or adjusted under 35 U.S.C. 154(b) by 0 days.

(21) Appl. No.: 14/348,647

(22) PCT Filed: Sep. 26, 2012

(86) PCT No.: PCT/KR2012/007741
§ 371 (c)(1),
(2) Date: Mar. 31, 2014

(87) PCT Pub. No.: WO2013/048102
PCT Pub. Date: Apr. 4, 2013

(65) Prior Publication Data
US 2014/0250500 A1 Sep. 4, 2014

(30) Foreign Application Priority Data
Sep. 29, 2011 (KR) .................. 10-2011-0099399

(51) Int. Cl.
G06F 21/32 (2013.01)
H04L 29/06 (2006.01)
G06K 9/00 (2006.01)
H04L 29/08 (2006.01)
H04L 12/24 (2006.01)

(52) U.S. Cl.
CPC ............ *H04L 63/0861* (2013.01); *G06F 21/32* (2013.01); *G06K 9/00885* (2013.01); *G06K 9/00979* (2013.01); *H04L 67/10* (2013.01); *H04L 63/105* (2013.01)

(58) Field of Classification Search
CPC ................ G06F 9/5077; G06F 11/301; G06F 2201/815; G06F 2212/151; G06F 21/32; G06F 21/44
See application file for complete search history.

(56) References Cited

U.S. PATENT DOCUMENTS

2012/0284516 A1* 11/2012 Errico .................... 713/168

FOREIGN PATENT DOCUMENTS

KR  10-1213984  12/2012

* cited by examiner

*Primary Examiner* — Venkat Perungavoor
(74) *Attorney, Agent, or Firm* — Noviack, Kim & Lee, PLLC; Jae Youn Kim

(57) ABSTRACT

A security-enhanced cloud system is provided. The system includes a mobile terminal for creating fingerprint recognition information and face recognition information or biometric recognition information by recognizing a fingerprint and a face or a body of a user; and a private virtualized cloud server allowing use of first class document data of a high security level and second class document data of a low security level by permitting only connection of a computer of the user after being activated in response to the wake-on command transmitted from the control system. The user authentication is completed by transmitting the created fingerprint recognition information and face recognition information or biometric recognition information to the control system in response to the authentication request.

10 Claims, 5 Drawing Sheets

SECURITY-ENHANCED CLOUD SYSTEM AND SECURITY MANAGEMENT METHOD THEREOF

BACKGROUND OF THE INVENTION

1. Field of the Invention

The present invention relates to a security-enhanced cloud system and a security management method thereof, and more specifically, to a cloud system for enhancing security of a private virtualized cloud server and a security management method thereof.

2. Background of the Related Art

Recently, construction of a cloud computing system based on a virtualization technique tends to be increases in order to effectively manage IT resources of an enterprise and save cost thereof. Such a cloud computing system refers to a distributed computing system which provides a plurality of users with an independent virtual machine on a supercomputer or a same hardware platform in which a plurality of computers is connected to operate like one computer.

A variety of devices such as a PC, a tablet PC, a notebook computer, a mobile terminal (cellular phone) and the like may be connected to the cloud computing system as a client, and thus each of the client devices may use IT resources provided by the cloud computing system. Such a cloud computing system and the client devices connected thereto are generally referred to as a 'cloud system'.

However, although such a cloud computing system provides efficiency in using resources by using hardware resources divided to meet requirements of users, it is worried that when a virtual machine is infected by a malicious code or a bot, the other virtual machines existing on the same hardware platform may also be infected.

The infected virtual machines are in the risk of being used for a Distributed DoS (DDoS) attack which can lead to a large scale of damage. The DDoS attack, which is a kind of DoS attack, is an attack which concentrates traffics on a target network or server in an integrated form by a plurality of distributed attack programs, and the DDoS attack is difficult to detect compared with a general DoS attack and has a further potent destructive power.

In addition, a conventional cloud computing system maintains a state always exposed to security issues since a plurality of client devices is connected through an open wireless communication network. Accordingly, a cloud system of a new type with enhanced security is required.

SUMMARY OF THE INVENTION

Therefore, the present invention has been made in view of the above problems, and it is an object of the present invention to provide a security-enhanced cloud system, which can protect data in a private virtualized cloud server by creating the virtualized cloud server from a cloud computing system so as to be connectible only by one user and tightening a right to access the virtualized cloud server and permission of using the data.

A characteristic configuration of the present invention for accomplishing the above object is as described below.

According to an embodiment of the present invention, there is provided a security-enhanced cloud system including: a control system for performing user authentication using fingerprint recognition and face recognition or biometric recognition and creating a wake-on command; a mobile terminal for creating fingerprint recognition information and face recognition information or biometric recognition information by recognizing a fingerprint and a face or a body of a user, and, if an authentication request is received from the control system after connecting to the control system, completing the user authentication by transmitting the created fingerprint recognition information and face recognition information or biometric recognition information to the control system in response to the authentication request; a private virtualized cloud server allowing use of first class document data of a high security level and second class document data of a low security level by permitting only connection of a computer of the user after being activated in response to the wake-on command transmitted from the control system, and automatically shut down when the user of the computer requests or two or more users are connected; and the computer using the data in the private virtualized cloud server after acquiring a right to connect to the private virtualized cloud server by permission of the private virtualized cloud server.

The control system according to the embodiment described above may include: an authentication database for storing fingerprint information, face information, biometric information and membership information of users who have joined a cloud service; and a control server for examining whether or not the fingerprint recognition information, the face recognition information or the biometric recognition information received from a certain user matches the fingerprint information, the face information or the biometric information stored in the authentication database, transmitting a user authentication confirmation message to the mobile terminal of the user if it is determined that the fingerprint recognition information, the face recognition information or the biometric recognition information matches the fingerprint information, the face information or the biometric information, and creating the wake-on command in response to the user authentication confirmation message.

In this case, the control system in the embodiment may terminate connection of the mobile terminal in response to the created wake-on command, further receive a phone number of the mobile terminal from the computer of the user, and further performs authentication on the mobile terminal by examining whether or not the phone number is in the membership information stored in the authentication database.

In addition, the private virtualized cloud server in the embodiment may terminate connection to the control system in response to the wake-on command, record log information for connected users and periodically transmit the log information when the mobile terminal is connected, and receive the biometric recognition information from the computer and perform authentication to enhance a right to access the first class document data.

According to another embodiment of the present invention, there is provided a security management method of a cloud system, including the steps of: (a) performing authentication between a control system and a certain mobile terminal using fingerprint recognition information and face recognition information or biometric recognition information; (b) terminating communication between the control system and the mobile terminal after the authentication is completed and activating a private virtualized cloud server using a wake-on command; (c) permitting only connection of a computer of a user after the authentication is completed, by the private virtualized cloud server; (d) granting a differentiated use right according to importance of a data, by the private virtualized cloud server, when the data in the private virtualized cloud server is to be used after connection of the computer is permitted; and (e) automatically shutting down the private virtualized cloud server when the user of the computer who has completed a work requests or two or more users are connected.

The security management method of a cloud system according to another embodiment of the present invention described above may further include, between steps (d) and (e), the step of recording log information for connected users and periodically informing the computer of the log information, by the private virtualized cloud server.

DESCRIPTION OF SYMBOLS

| | |
|---|---|
| 10: Cloud system | 100: Control system |
| 110: Authentication database | 120: Control server |
| 200: User | 210: Mobile terminal |
| 220: Computer | 300: Private virtualized cloud server |
| 310: Cloud computing system | |

DETAILED DESCRIPTION OF THE PREFERRED EMBODIMENT

The preferred embodiments of the invention will be hereafter described in detail with reference to the accompanying drawings so that those skilled in the art can easily implement the present invention.

First Embodiment

Figure 1:
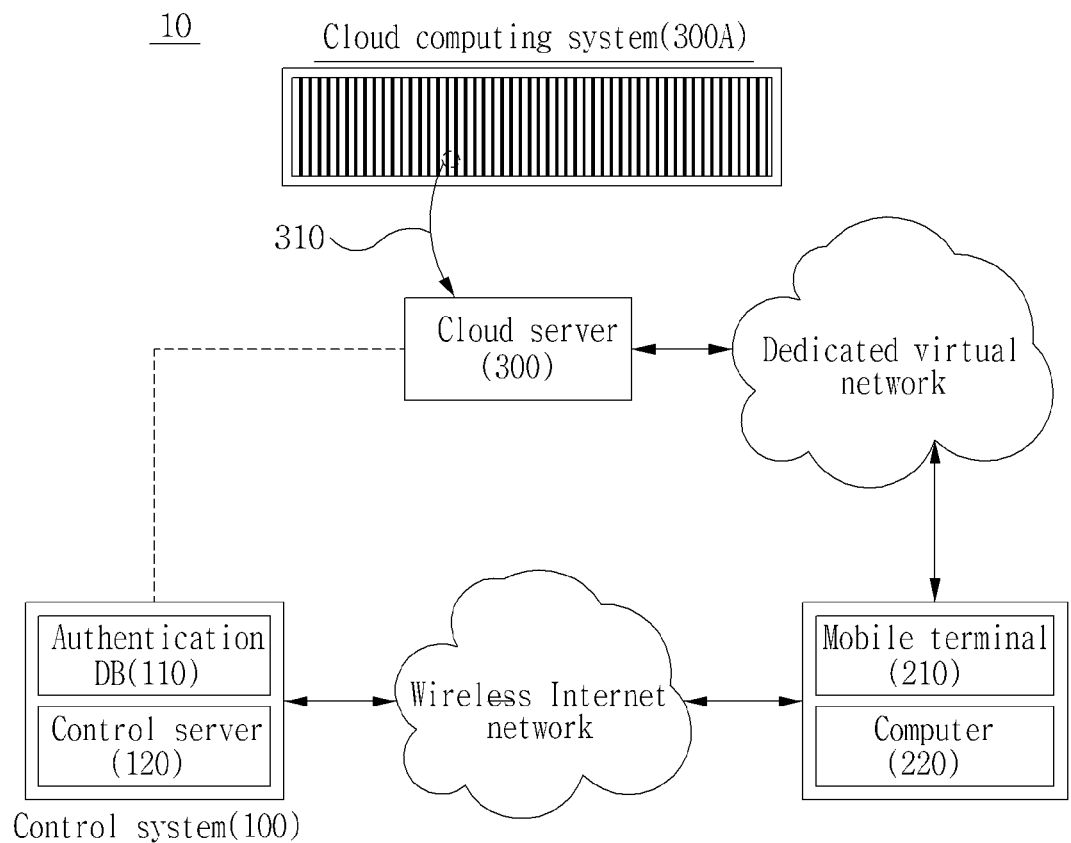
FIG. 1 a view exemplarily showing a cloud system according to a first embodiment of the present invention.

FIG. 1 a view exemplarily showing a cloud system according to a first embodiment of the present invention.

As shown in FIG. 1, the cloud system 10 according to a first embodiment of the present invention includes a control system 100, a mobile terminal of a user 210, a computer 220 of a user, and a private virtualized cloud server 300.

First, the control system 100 is positioned between the virtualized cloud server 300 which will be described below and the mobile terminal of each user or between the private virtualized cloud server 300 and the computer of each user and functions as a security means for protecting the cloud system 10 from a hacking attack which tries to access a cloud computing system 300A and the virtualized cloud server 300. To function as a security means, a security program such as a firewall is installed and operated, and each user who is an object trying to connect to the private virtualized cloud server 300 is authenticated.

To process the authentication, the control system 100 of the present invention has an authentication database (DB) 110 and a control server 120. The authentication database 110 stores fingerprint information, face information or biometric information and membership information or the like of users who join a cloud service (a generic term referring to services provided for the users using cloud computing), which are received from each of the users.

The fingerprint information described here is a generic term referring to a unique fingerprint that each user has, the face information is a generic term referring to a face image that each user has, the biometric information is a generic term referring to blood vessel or iris information which appears as biometric recognition techniques are developed, and the membership information means a further broader concept including personal information (e.g., a resident registration number, an address, an age, a name and the like) and mobile terminal information (e.g., a phone number and a unique number of a mobile terminal) that each user has.

The authentication database 110 means a general data structure implemented in a storage space (a hard disk or memory) of a computer system using a database management program (DBMS), which means a data storage form which can freely search (extract), delete, edit and add a data, and it can be implemented to meet the object of the embodiment using a relational database management system (RDBMS) such as Oracle, MSSQL, Informix, Sybase, DB2, MySQL or the like, an object-oriented database management system (OODBMS) such as Gemston, Orion, O2 or the like, or an XML native database such as Excelon, Tamino, Sekaiju or the like, or it may be a form having a field or an element suitable for accomplishing its own functions.

Contrarily, if there is a request of a certain user 200 for connecting to the private virtualized cloud server 300, the control server 120 of the present invention first performs a process of examining (searching for) fingerprint recognition information and face recognition information received from the user 200 based on the fingerprint information and the face information stored in the authentication database 110 to authenticate the user 200.

If it is determined that any one of the fingerprint recognition information, the face recognition information and biometric information of the user 200 matches the fingerprint information or the face information stored in the authentication database 110, the control server 120 transmits a user authentication confirmation message to the mobile terminal 210 of the user 200. It is apparent that the user authentication confirmation message is information responded to the authentication request of the user as a confirmative answer.

In addition, the control server 120 of the present invention further performs a function of creating and transmitting a wake-on command to the virtualized cloud server 300 in response to the user authentication confirmation message, as soon as transmitting the user authentication confirmation message to the mobile terminal 210 of the user 200. The created wake-on command, which will be described below in detail, is used to activate the virtualized cloud server 300.

Like this, the control system 100 according to a first embodiment of the present invention provides an advantage of primarily blocking illegal users trying to access the virtualized cloud server 300 by performing user authentication to protect the cloud system from an external hacking attack.

Next, the mobile terminal 210 of the user of the present invention is a client device shown as an example among a plurality of users, and in order to use a cloud service, the mobile terminal 210 creates 310 the private virtualized cloud server 300 from the cloud computing system 300A after remotely connecting to the cloud computing system 300A through the control system 100 described above. At this point, the cloud computing system 300A is generally a widely known system.

If the private virtualized cloud server 300 is created as described above, the mobile terminal 210 of the present invention conducts an authentication function as a main function between the mobile terminal 210 and the control system 100 so that the computer 200 of the user may use data stored in the private virtualized cloud server 300.

The mobile terminal 210 like this is used as a concept generally referring to a mobile device using a mobile communication service (a wireless Internet network), and a W-CDMA smart phone, an LTE smart phone, a WiBro smart phone and the like may be examples of the mobile terminal.

In addition, although only an IT device using the private virtualized cloud server 300 is used as the mobile terminal 210 in the first embodiment, it is not limited thereto, but another IT device may substitute for the IT device apparently. For example, an IT device (a client device) such as a computer, a desktop computer, a tablet computer, a notebook computer, a netbook computer or the like may be an example thereof.

When the mobile terminal 210 of the present invention desires to connect to the private virtualized cloud server 300, it first creates fingerprint recognition information and face recognition information or biometric recognition information by recognizing a fingerprint and a face or a body of its own (the user). Subsequently, when an authentication request is received from the control system 100 while connecting to the control system 100, the mobile terminal 210 of the present invention performs a function of transmitting the created fingerprint recognition information and face recognition information or biometric recognition information to the control system 100 in response to the authentication request.

The authentication between the mobile terminal 210 of the user 200 and the control server is finally completed by such a function, and the mobile terminal 210 of the present invention performs a function of activating the private virtualized cloud server 300 created by the mobile terminal (the user).

Accordingly, the computer 220 of the user acquires a right to connect to the private virtualized cloud server 300 and thus may use the data stored in the private virtualized cloud server 300.

However, in order to use the data stored in the private virtualized cloud server 300, the mobile terminal 210 may directly communicate with the private virtualized cloud server 300 instead of connecting to the private virtualized cloud server 300 through the control system 100.

As described above, if the control system 100 of the present invention activates the private virtualized cloud server 300 by transmitting a wake-on command to the private virtualized cloud server 300, a direct communication is established between the computer 220 and the private virtualized cloud server 300 through a process of permitting the computer 220 of the user to automatically connect to the private virtualized cloud server 300, and thus the data stored in the private virtualized cloud server 300 may be used.

In the conditions described above, connection between the control system 100 and the mobile terminal 200 is terminated by transmitting a command for terminating connection of the mobile terminal 210 to the mobile terminal 210 in response to the wake-on command as soon as the control system 100 transmits the created wake-on command to the private virtualized cloud server 300.

Owing to the termination of connection, access of other users penetrating by stealing the fingerprint recognition information and the face recognition information of the owner of the mobile terminal 210 may be fundamentally prevented. Accordingly, the control system 100 may primarily complete security of authentication for the user as described above.

Meanwhile, establishing a direct communication means that it may operate like a dedicated virtual network in an open communication network structure. The above procedure will be described below in further detail when the private virtualized cloud server 300 is described.

The computer 220 of the user described above may perform additional functions, and it can be used as an authentication means of a supportive function of the mobile terminal 210 which desires to connect to the private virtualized cloud server 300.

To function as an authentication means, the computer 220 of the user of the present invention receives and transmits the phone number of its own mobile terminal to the control system 100. Then, the control system 100 of the present invention is further provided with information on the phone number of the mobile terminal 210 from the computer 220 of the user 200 and examines whether or not the phone number is included in the membership information stored in the authentication database 110, in addition to using the fingerprint recognition information and the face recognition information as described above, and thus may use the information on the phone number of the mobile terminal 210 to authenticate the mobile terminal 210. The additional authentication using information on the phone number is helpful for enhancing the security level by further intensifying user authentication.

Finally, if the private virtualized cloud server 300 of the present invention is automatically activated in response to the wake-on command transmitted from the control system 100, it performs a function of requesting the control system 100 to terminate the connection. The request is to prevent intrusion of other users through the control system and to communicate with the computer 220 of the user in the form of a dedicated virtual network after the user authentication is completed.

That is, the private virtualized cloud server 300 of the present invention transmits a connection permission message to the computer 220 of the user, for which the user authentication has been completed through the dedicated virtual network in response to the wake-on command. Owing to the effect of the dedicated virtual network, security of accessibility is further enhanced.

Accordingly, only the computer 220 of the user permitted to connect may use the private virtualized cloud server 300 created and activated by the computer 220 itself. However, an additional authentication should be passed for the computer 220 of the user permitted to connect in order to use the private virtualized cloud server 300.

That is, the private virtualized cloud server 300 of the present invention may be constructed as two or more virtual servers depending on the security level of a data created by the user 200. For example, a first virtual server among the virtual servers may store first class document data of a high security level, and a second virtual server may store second class document data of a low security level.

At this point, in order to enhance the right to access the first class document data, the private virtualized cloud server 300 of the present invention receives biometric recognition information from the computer 220 of the user and performs authentication. The biometric recognition information includes information on recognition of a voice, a face, an iris, distribution of palm lines and vessels and the like, as well as recognition of a finger and a face. At this point, the biometric recognition information may be authenticated through the mobile terminal 210.

For example, face recognition may be implemented in a method of three-dimensionally grasping a face shape or analyzing heat distribution on the face. Even in the case of a fingerprint, fingerprint information further including additional detailed information such as a pattern, directionality and scale direction of the fingerprint is applied in the private virtualized cloud server 300.

As described above, owing to the security enhanced by using the biometric recognition information, the present invention provides an advantage of safely keeping user's data by further intensifying access to the virtual server storing top secret data.

In addition, the private virtualized cloud server 300 of the present invention periodically monitors the user connected through an external communication network, and if it is determined that two or more users are simultaneously connected, it may be programmed to terminate the connections by automatically performing a shutdown command.

In addition, the private virtualized cloud server 300 may further maintain a case of automatically shutting down, and this is a case of receiving a user's request from the computer 220 of the user. That is, if a user logs out from the private virtualized cloud server 300 after connecting to the private virtualized cloud server 300 and using data through his or her own computer 220, the private virtualized cloud server 300 may be turned off by automatically performing a shut down command.

Second Embodiment

Figure 2:
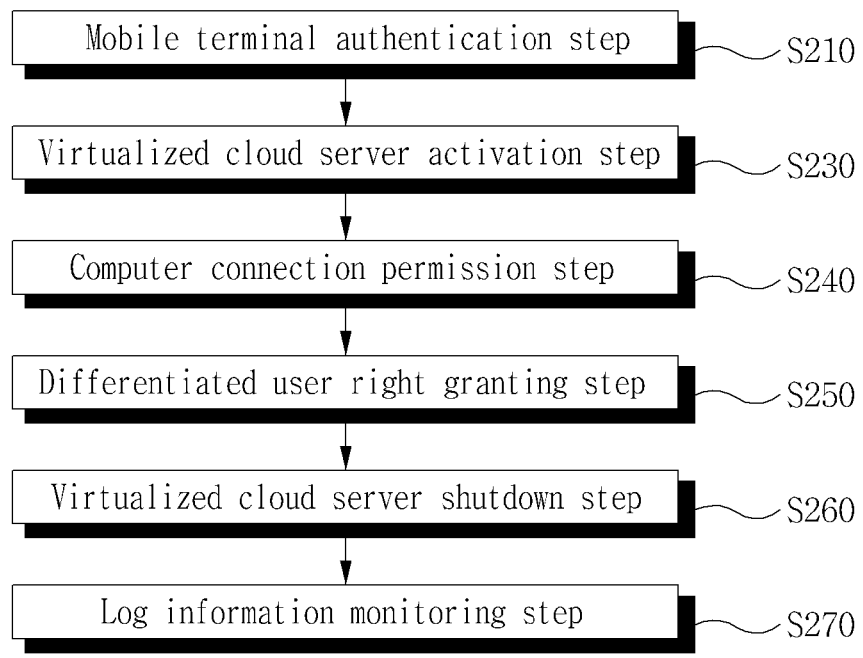
FIG. 2 a view exemplarily showing a security management method S200 of a cloud system 10 according to a second embodiment of the present invention.

FIG. 2 a view exemplarily showing a security management method S200 of a cloud system 10 according to a second embodiment of the present invention.

Figure 3:
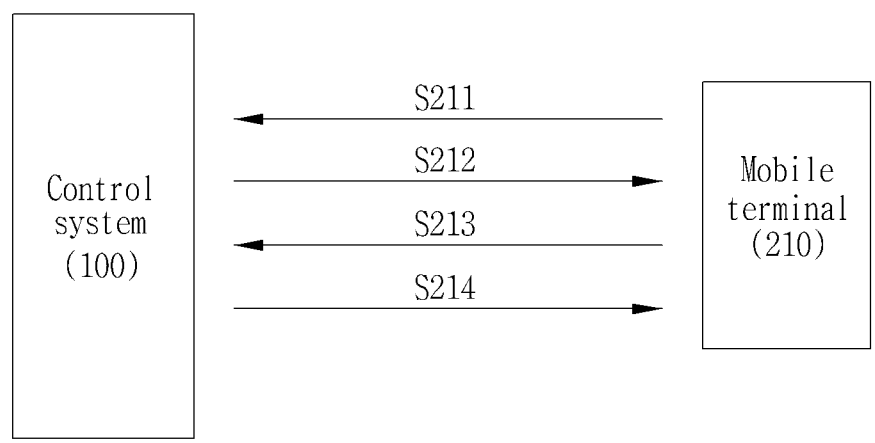
FIG. 3 a view exemplarily showing an authentication processing step between a mobile terminal 210 and a control system 100 according to a second embodiment of the present invention.
Figure 4:
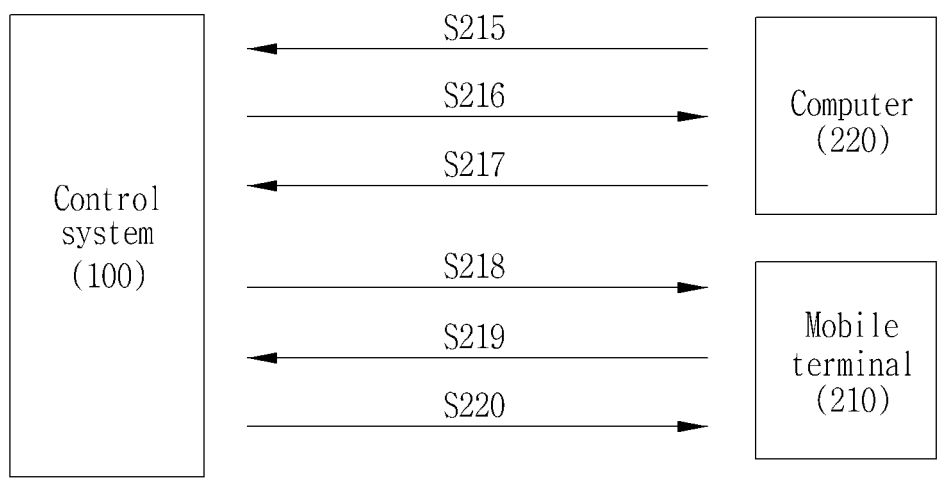
FIG. 4 a view exemplarily showing an authentication processing step between a mobile terminal 210/computer 220 and a control system 100 according to a second embodiment of the present invention.
Figure 5:
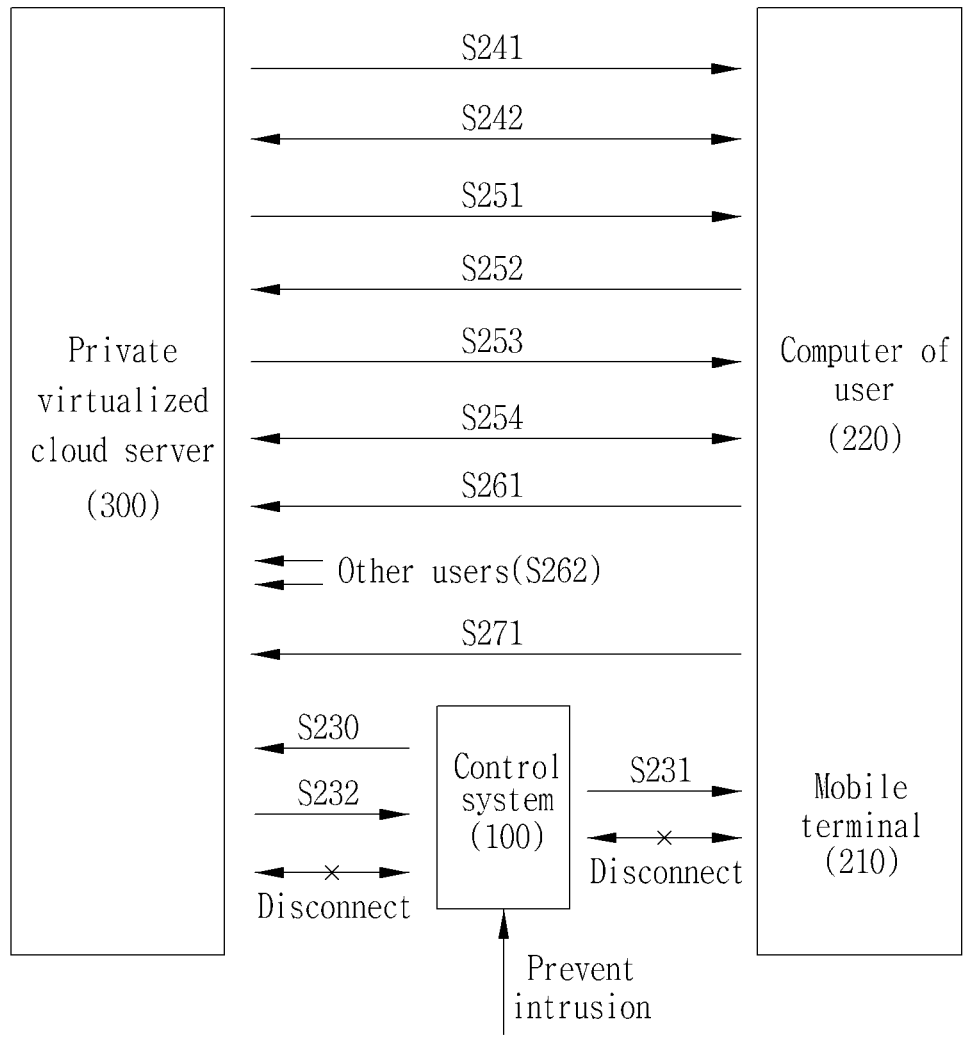
FIG. 5 a view exemplarily showing an authentication processing step between a mobile terminal 210 and a private virtualized cloud server 300 according to a second embodiment of the present invention.

FIG. 3 a view exemplarily showing an authentication processing step between a mobile terminal 210 and a control system 100 according to a second embodiment of the present invention, FIG. 4 a view exemplarily showing an authentication processing step between a mobile terminal 210/computer 220 and a control system 100 according to a second embodiment of the present invention, and FIG. 5 a view exemplarily showing an authentication processing step between a mobile terminal 210 and a private virtualized cloud server 300 according to a second embodiment of the present invention.

As shown in FIG. 2, the security management method S200 of the cloud system 10 according to a second embodiment of the present invention includes a mobile terminal authentication step S210, a virtualized cloud server activation step S230, a computer connection permission step S240, a differentiated user's right granting step S250, a virtualized cloud server shutdown step S260 and a log information monitoring step S270.

First, in step S210 of the present invention, a process of performing authentication between the control system 100 and the mobile terminal 210 using fingerprint recognition information and face recognition information is performed. Such a process will be described with reference to FIGS. 3 and 4. The mobile terminal 210 shown in FIG. 3 first transmits a connection request to the control system 100 in order to connect to the virtualized cloud server 300 created by the mobile terminal itself S211. At this point, the mobile terminal 210 is merely an example of an IT device.

Then, the control system 100 transmits a user authentication confirmation message to the mobile terminal 210 by way of a wireless network in response to the connection request of the mobile terminal 210 S212. The mobile terminal 210 receiving the user authentication confirmation message transmits fingerprint recognition information and face recognition information recognized by a fingerprint and face recognition device to the control system 100 S213.

Then, the control system 100 searches for the fingerprint recognition information and the face recognition information from the authentication database 110 and may transmit the fact that the authentication is completed to the mobile terminal 210 as an affirmative answer if it is determined that information matching to the fingerprint recognition information or the face recognition information exists therein or transmit the fact that the authentication is rejected to the mobile terminal 210 as a negative answer if it is determined that information matching to the fingerprint recognition information or the face recognition information does not exist therein S214.

Like this, the authentication process using the fingerprint recognition information and the face recognition information or the biometric recognition information provides an advantage of high security compared with widely-known general authentication using a user name and a password.

Contrarily, after connecting to the control system 100 S215, the computer 220 shown in FIG. 4 receives a first user authentication confirmation message S216 and inputs and transmits its own mobile terminal number to the control system S217. The other processing steps of the mobile terminal 210 and the control system 100 S218, S219 and S220 are the same as the steps described above S212, S213 and S214. Such an authentication method using its own mobile terminal 210 may act as an effect of enhancing security further more.

Hereinafter, steps S230 to S260 of the present invention will be described with reference to FIGS. 1 to 5.

As shown in the figures, in step S230 of the present invention, after the authentication is completed at step S210, completion of the authentication is reported to the mobile terminal 210 S231 to terminate communication between the control system 100 and the mobile terminal 210, and a step of activating the private virtualized cloud server 300 S230 is performed using a wake-on command.

In addition, if the wake-on command is received from the control system 100, the private virtualized cloud server 300 transmits a message indicating that connection to the control system 100 will be terminated to the control system 100 in response to the wake-on command S232, and communication between the private virtualized cloud server 300 and the control system 100 is terminated.

The reason of terminating communication between the control system 100 and the mobile terminal 210 and between the private virtualized cloud server 300 and the control system 100 as described above is for direct communication between the private virtualized cloud server 300 and the mobile terminal 210 and, above all, to prevent intrusion of other users through the control system 100. Security can be further enhanced through the procedure of multiple steps described above.

Then, in step S240 of the present invention, if the private virtualized cloud server 300 transmits a connection permission message to the computer 220 of the user S241, permission of connection is completed if the computer 220 of the user accepts the request. Accordingly, the computer 220 of the user may connect to the private virtualized cloud server 300 and use data of a low security level stored in the virtualized cloud server 300 S242. At this point, when a data of a high security class is desired to be used, step S250 is performed.

That is, in step S250 of the present invention, if a data in the private virtualized cloud server 300 is desired to be used after connection of the computer 200 of the user is permitted, the private virtualized cloud server 300 performs a step of granting a differentiated use right according to importance of the data. For example, if the user accesses a data of a high security level S242, the private virtualized cloud server 300 immediately transmits an authentication request message requesting input of biometric recognition information to the computer 220 of the user S251. In the case of a data of a low security level, the user continues to use the data in a way the same as before.

Then, the computer 220 of the user recognizes its own biometric information and transmits biometric recognition information to the private virtualized cloud server 300 in response to the user authentication confirmation message (authentication request message) S252 and receives an affirmative answer indicating completion of authentication if the user is a normal person S253. Therefore, the computer 220 of the user may freely use confidential data of a high security class S254. Like this, the biometric recognition information provides an advantage which is very beneficial in enhancing security.

Next, in step S260 of the present invention, when a user of the computer 220 who has completed a work requests S261 or when two or more users are connected S262, a process of automatically shutting down the private virtualized cloud server 300 is performed. Owing to shutdown of the private virtualized cloud server 300, there is provided an advantage of safely keeping data from external intruders.

Finally, in step S270 of the present invention, the private virtualized cloud server 300 may further perform a step of recording and periodically monitoring log information for connected users before step S260 is completed and informing the computer 220 of the user or the mobile terminal 210 of a result of the log information at a randomly set time through a log information message S271. Therefore, the user may safely maintain the virtualized cloud server 300 created by the user himself or herself.

Third Embodiment

In the case of Internet banking, although security is severely damaged by hacking since a one layer server system in which a PC of a user directly connects to and uses an Internet banking server is used, this is not a method of constructing a multi-layer server system and connecting the PC of a user through an accredited certificate and encrypted authentication.

In the case where the PC connects to a server system through an accredited certificate and encrypted authentication, there is a problem in that the server can be hacked through the PC of a user if the PC of a user is infected to be a zombie PC, and thus this method is not used.

This is a system in which, basically, a PC of a user cannot directly connect to an Internet banking server of a bank, but a private virtualized account server is placed between the PC and the Internet banking server for each user, and the PC may exchange information with the Internet banking server through the private virtualized account server.

Accordingly, when the user PC connects to the private virtualized account server of its own, the private virtualized account server is logically turned off in usual times in a manner the same as described above, and the Internet line is also disconnected. In order to wake up the private virtualized account server and connect the line, the virtualization account server should be turned on, and server wake-on should be requested through the control server connected to the Internet line. Then, the control server receiving the request performs authentication for the user through a cellular phone or a smart phone of the user to authenticate the user.

At this point, in authentication of a low security level, the smart phone authentication of the user may use a method of inputting an authentication number included in a wake-on message that the user receives into the PC. For authentication of a further higher security level, fingerprint recognition information, face recognition information or biometric recognition information of the user is transmitted using a smart phone which stores the fingerprint recognition information, the face recognition information or the biometric recognition information, and, in addition, the level of authentication security is further enhanced by transmitting a phone number, a serial number or the like of the smart phone.

If the control server confirms the biometric authentication information of the user, the control server performs wake-on by transmitting a wake-on message to the private virtualized account server of the user, and if the private virtualized account server is turned on, the Internet line is connected.

Then, in order to prevent the user PC from being turned into a zombie PC, the private virtualized account server makes the user PC as a zombie. At this point, a firewall is formed to turn down any external attempt of connecting to the user PC, and if there is any small intrusion signal, connection to the user PC and the private virtualized account server is immediately blocked, and the private virtualized account server is turned off. Accordingly, intrusion to the user PC and the private virtualized account server is fundamentally blocked.

Although the private virtualized account server of the user is turned on, it is not yet connected to the Internet banking system of a bank. If the private virtualized account server requests an Internet banking data of the bank, a work on the requested value may be performed only through an intermediate server which performs connection and disconnection of an internal network between the Internet banking server of the bank and the private virtualized account server and performs a messenger function for the requested value.

Therefore, the private virtualized account server is not directly connected to the Internet banking server of the bank, but indirectly connected through the intermediate server. In addition, when the intermediate server is connected to the Internet banking server of the bank, connection to the private virtualized account server is disconnected, and when the intermediate server attempts connection to the private virtualized account server, it functions as an intermediate bay of a submarine by disconnecting the connection to the Internet banking server of the bank beforehand, and thus perfection of security is pursued.

This embodiment may be applied to accessing and using a confidential document in a government office or an enterprise, as well as banking transactions.

According to the present invention, an effect of safely protecting the data (confidential data and the like) in the virtualized cloud server from hacking is accomplished by creating a private virtualized cloud server for each user, and completing primary security by performing user authentication through the control system formed before to tighten connection to the cloud server, and completing secondary security by performing differentiated authentication for using the data stored in the cloud server.

As a method of further enhancing security against external hacking on using data, it is configured to divide servers into a first class server and a second class server, connect the first class server and the second class server through a closed internal network line of a company which is not connected to the Internet, connect and disconnect the second class server and a user PC through an external Internet network, and place an intermediate server to control a line connection situation between the second class server and the user PC. At this point, the first class server of the internal network is turned on almost always since it is a common server of the company, and a single server or a private virtualized cloud server will be selected as the second class server. Security of the single server is enhanced by turning off the server, and the common server commonly used by a lot of people is physically turned on as a common server platform although it is logically turned off as a private virtualized cloud server of an individual, and it is structured to connect one end of the virtualized cloud server to the first class server through the internal network and connect the other end of the virtualized cloud server to an external user PC through the external Internet network.

In addition, connection and disconnection between the first class server and the second class server through the internal network is controlled by the first-second class intermediate server, and connection and disconnection between the second class server and the user PC is controlled by the control server.

In addition, according to the present invention, an effect of safely protecting data (confidential data and the like) of the private virtualized cloud server from hacking is accomplished by primarily completing security by terminating connection of the mobile terminal through the control system after authentication is completed and completing secondary security of automatically shutting down the private virtualized cloud server when a plurality of users is connected or a user requests disconnection.

In addition, according to the present invention, since fingerprint recognition and face recognition or biometric recognition is applied to be appropriate to a server-client environment as a means for authenticating a user, an effect of enhancing user security is accomplished by providing a security mechanism of a new type in the cloud system.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A security-enhanced cloud system comprising:
a control system for performing user authentication using fingerprint recognition and face recognition or biometric recognition and creating a wake-on command;
a mobile terminal for creating fingerprint recognition information and face recognition information or biometric recognition information by recognizing a fingerprint and a face or a body of a user, and, if an authentication request is received from the control system after connecting to the control system, completing the user authentication by transmitting the created fingerprint recognition information and face recognition information or biometric recognition information to the control system in response to the authentication request; and
a private virtualized cloud server allowing use of first class document data of a high security level and second class document data of a low security level by permitting only connection of a computer of the user after being activated in response to the wake-on command transmitted from the control system, and automatically shutting down when the user of the computer requests or two or more users are connected,
wherein the computer uses the data in the private virtualized cloud server after acquiring a right to connect to the private virtualized cloud server by permission of the private virtualized cloud server.

2. The system according to claim 1, wherein the control system includes:
an authentication database for storing fingerprint information, face information, biometric information and membership information of users who have joined a cloud service; and
a control server for examining whether or not the fingerprint recognition information, the face recognition information or the biometric recognition information received from the user matches the fingerprint information, the face information or the biometric information stored in the authentication database, transmitting a user authentication confirmation message to the mobile terminal of the user if it is determined that the fingerprint recognition information, the face recognition information or the biometric recognition information matches the fingerprint information, the face information or the biometric information, and creating the wake-on command in response to the user authentication confirmation message.

3. The system according to claim 2, wherein the control system terminates connection of the mobile terminal in response to the created wake-on command, and the private virtualized cloud server terminates connection to the control system in response to the wake-on command.

4. The system according to claim 3, wherein the control system further receives a phone number of the mobile terminal from the computer and further performs authentication on the mobile terminal by examining whether or not the phone number is in the membership information stored in the authentication database.

5. The system according to claim 1, wherein the private virtualized cloud server records log information for connected users and periodically transmits the log information when the computer is connected.

6. The system according to claim 1, wherein the private virtualized cloud server receives the biometric recognition information from the computer and performs authentication to enhance a right to access the first class document data.

7. A security management method of a cloud system, the method comprising the steps of:
(a) performing authentication between a control system and a certain mobile terminal using fingerprint recognition information and face recognition information or biometric recognition information;
(b) terminating communication between the control system and the mobile terminal after the authentication is completed and activating a private virtualized cloud server using a wake-on command;
(c) permitting only connection of a computer of a user after the authentication is completed, by the private virtualized cloud server;
(d) granting a differentiated use right according to importance of a data, by the private virtualized cloud server, when the data in the private virtualized cloud server is to be used after connection of the computer is permitted; and
(e) automatically shutting down the private virtualized cloud server when the user of the computer who has completed a work requests or two or more users are connected.

8. The method according to claim 7, further comprising, between steps (d) and (e), the step of recording log information for connected users and periodically informing the computer of the log information, by the private virtualized cloud server.

9. The method according to claim 7, wherein step (a) further performs authentication between the control system and the mobile terminal using phone number information.

10. The method according to claim 7, wherein when the use right is to be granted for a first class document data of a high security level among the data stored in the private virtualized cloud server, step (d) grants the use right after authenticating the computer using the biometric recognition information.

* * * * *